May 31, 1960
G. BACHMANN
2,938,294
FISH LURE
Filed Oct. 16, 1957
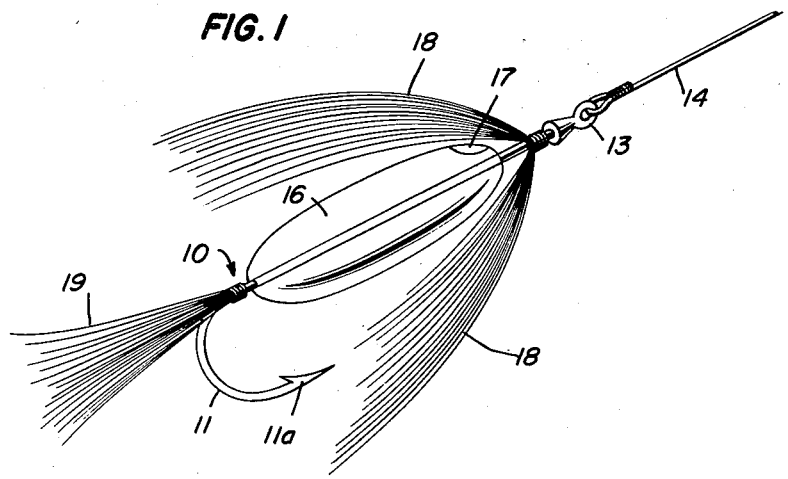
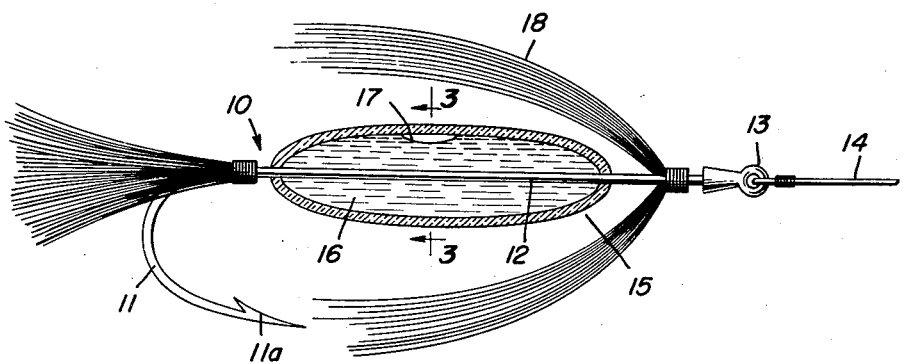
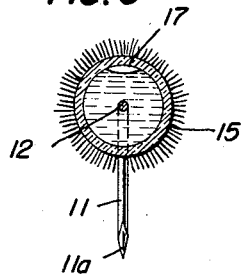
INVENTOR
Gunnar Bachmann
ATTORNEY

United States Patent Office 2,938,294
Patented May 31, 1960

2,938,294
FISH LURE

Gunnar Bachmann, deceased, late of Reykjavik, Iceland, by Gudjon Bachmann, administrator, 108-07 65 Road, Apt. 5B, Forest Hills, N.Y.

Filed Oct. 16, 1957, Ser. No. 690,500

3 Claims. (Cl. 43—42.33)

This invention relates to artificial bait and more particularly to artificial lures for use in the art of fishing.

An object of this invention is the provision of a practical and reliable fish lure by which fish are unwarily attracted to a hook by active attraction produced in the body of the lure.

Another object of this invention is the provision of a moving air bubble effect in a fish hook for attracting fish to the hook.

A further object is that of providing a fish lure having a body which is suggestive of a living organism such as a fly, minnow, or the like, and with which air bubble activity is combined to suggest real life by introducing bubble action suggestive of that which often accompanies such in or on the water.

A still further object of this invention is the provision of a fish lure of the character indicated which in having highly desirable properties of attraction is nevertheless easy to produce and reliably stays in adjustment and operative condition.

Other objects in part will be obvious and in part more fully pointed out hereinafter.

In the accompanying drawing representing a preferred embodiment of the present invention:

Figure 1 is a perspective view of a lure in one of the positions the lure assumes when used below the surface of the water;

Figure 2 is a longitudinal section of the lure shown in Figure 1; and

Figure 3 is a section taken along 3—3 of Figure 2 in the direction of the arrow.

Like reference characters denote like portions throughout the several figures of the drawing.

As conducive to a clearer understanding of certain features of this invention it may be noted here that artificial lures are intended in some manner to possess properties for attracting fish to the hook so that the fish can be caught, and are in considerable demand by fishermen and sportsmen. Among the artificial lures heretofore known are those which when used on or under the surface of the water produce the general appearance of an insect, minnow or other type of life upon which fish normally feed. There are lures which depend on color, brillance, reflectance or on the movements or activity which they produce in the water for their effect. Some sportsmen prefer to maneuver artificial lures on a line in the water so as to catch fish wholly without edible bait in the class of live minnows, crab meat, worms, shrimp, or the like. This is a restricted form of sport, considering that skill and the choice of lures determine success. By adding edible bait, however, it is possible for the artificial lure still to serve such functions as attracting the fish initially so that the bait will be found and taken more readily.

An outstanding object of the present invention is that of providing an artificial lure which is capable of production and sale at reasonable cost, the lure being effective for attracting fish whether used with or without edible bait and characterized by highly attractive activity based on changes in position of the lure in the water.

In accordance with the practice of the invention here concerned, a fish hook 10 (see the accompanying drawing) may be of the usual variety and sizes having a shank 12 and a hook member, the latter including curved portion 11 and barb 11a at the end of the curved portion. An eyelet 13 or other means for attachment is provided on the free end of shank 12 to accommodate a fishing line 14 or a leader. A hollow body 15 of such dimensions that it is secured to the shank portion 12 without interfering with the proper functioning of the curved portion 11 of the hook and its barb 11a, is a portion of the lure and contributes in a manner which will be explained more fully hereinafter. As illustrated in Figure 3 of the drawing the body 15 is substantially circular in transverse cross section and actually is oblong (see Figure 2) having its longest dimension in the longitudinal direction of shank 12. The opposite ends of body 15 are sealed to close the body cavity, the latter itself being oblong having its major axis in the same general direction as shank 12. In the embodiment represented, body 15 is disposed substantially concentrically about the shank 12 so that the longitudinal axis of the body and that of the shank substantially coincide, this resulting in a very compact correlation of the hook 10 and body 15 and contributing strength, good balance and rigidity of the several parts one to another. The outside end surfaces of the oblong body 15 advantageously are outwardly convex and the body wall thus rounds off toward shank 12, finally forming seals which are liquid tight against the shank. In this manner for example the shank 12 passes through the body cavity. Curved ends of the body lend streamlining and further the rounded end next to the barb 11a improves the clearance between the body and barb.

Body 15 is made of a substantially transparent substance, such for example as glass, synthetic resin, or the like, and is substantially full of liquid 16 such as water, alcohol or fluent glycerine, or the like and is hermetically sealed. The liquid may be clear or colored as desired and the body wall material is impermeable to the liquid. Of further importance, the body cavity is so plentifully filled with the liquid as to leave a small air space or bubble 17. The length of the bubble is considerably less than the longitudinal dimension of the cavity in body 15 and thus will race from end to end of the cavity when the body is tilted. The configuration of the inner surface of the wall of body 15 tolerates this movement of the bubble. The bubble size may for example be equivalent to that derived by the omission of one or several drops of a liquid which otherwise would entirely fill the cavity in body 15.

The body and hook combination may be trimmed in any of a variety of ways, preferably with double wing-like streamers 18 and a tail-like streamer 19 which create an insect lure effect. Other trim of course may be added or substituted depending upon the effect desired. The streamers 18 and 19 are made for example of bunched fibers such as hair. Streamers 18 are attached to the shank portion 12 of the hook between body 15 and the eyelet 13 while streamer 19 also is attached to the shank but is disposed between body 15 and the curved hook portion 11. The streamers conveniently are secured in place by wrapping thread around the shank and strands and covering the thread with an adhesive such as lacquer. Sometimes it is desirable to have the lure stay afloat on the surface of the water while fishing. This is conveniently achieved by adding a buoying element or elements to the lure, or streamers 18 and 19 sometimes themselves are made of a material which produces in the quantity used a buoying action which keeps the lure afloat.

When the lure is on or under the surface of the water, air bubble 17 is visible through the substantially transparent wall of body 15, to create an attraction to fish and, more significantly, resembles a bubble of air introduced in the water by a living organism. Bubble 17 shifts along the wall of body 15 within a considerable range of variations in angle of tilt of the body. Varying inclinations of the lure often occur from water currents or by manually maneuvering the line 14 to which the lure is attached. The air bubble 17 can take on high activity and in fact races from end to end of body 15 when the low end of the body is suddenly made the high end. The racing action is attractive to fish. The bubble of course seeks the high end of body 15, and in use the lure is merely placed on or below the surface of the water, consistent with any of several well known fishing techniques such as fly casting or bait casting. The lure is enhanced by the air bubble effect and accordingly is suggestive of a living organism.

Thus it will be seen that the various objects hereinbefore noted together with many thoroughly practical advantages are successfully achieved. It will be noted that the lure is characterized by having an active, attractive bubble of air provided in proximity to a fish hook and that the bubble and its activity are available for long and repeated use of the lure.

While considerable emphasis has been placed on lures which include trim, as for example streamers, it will be understood that at times trim is omitted in accordance with the present invention with certain advantages still remaining. The air bubble effect itself is attractive to fish, though proper trim enhances the effect. It will also be understood that the substantially transparent body wall associated with the air bubble effect may be specifically shaped producing a body having any of a variety of outside configurations such as a minnow shape, preserving the inside cavity and bubble, and that the body wall may itself support trim such as local or spot coatings of paint to lend color without rendering the air bubble invisible from outside the lure, still in accordance with the present invention.

As many possible embodiments may be made of the invention and as many possible changes may be made in the embodiments herein described, it will be distinctly understood that the subject matter hereinbefore set forth is to be interpreted as illustrative and not as a limitation.

What is claimed is:

1. A fish lure comprising a fish hook provided with a shank, a barbed hook member on one end of said shank and an eyelet adapted to receive a fishing line at the opposite end of said shank, a closed oblong tubular body having a substantially transparent wall enclosing said shank in an oblong cavity having its long dimension in the general direction of the length of said shank and the long dimension of said body, said cavity being visible through said transparent wall from outside the oblong tubular body along at least the majority of the long dimension of the cavity, and the opposite ends of said tubular body being sealed liquid tight to said shank between said eyelet and barbed hook member, streamers secured to said shank outside said opposite ends of said body to simulate an insect, and liquid substantially filling said cavity leaving a small air bubble in said cavity and visible through said transparent wall from outside the lure body, said bubble being considerably less in length than the long dimension of said oblong cavity and the surface of said wall next to said cavity being configurated for said air bubble to race freely from end to end of said cavity on said long dimension, thus for said air bubble to simulate in view through said transparent wall a bubble emitted by a living organism in the environs of said barbed hook member when said tubular body is tilted to attract fish.

2. A fish lure comprising a fish hook provided with a shank, a barbed hook member on one end of said shank and an eyelet adapted to receive a fishing line at the opposite end of said shank, a closed oblong tubular body having a substantially transparent wall enclosing said shank in an oblong cavity having its long dimension in the general direction of the length of said shank and the long dimension of said body, the opposite ends of said tubular body being sealed liquid tight to said shank, said cavity being visible through said transparent wall from outside the oblong tubular body along at least the majority of the long dimension of the cavity, and the corresponding end of said tubular body next to said barbed hook member being outwardly convex and sufficiently removed from said hook member for said hook member to engage and hold a fish, and liquid substantially filling said cavity leaving a small air bubble in said cavity and visible through said transparent wall from outside the lure body, said bubble being considerably less in length than the long dimension of said oblong cavity and the surface of said wall next to said cavity being configurated for said air bubble to race freely from end to end of said cavity on said long dimension, thus for said air bubble to simulate in view through said transparent wall a bubble emitted by a living organism in the environs of said barbed hook member when said tubular body is tilted to attract fish.

3. A fish lure comprising a fish hook provided with a shank, a barbed hook member on one end of said shank and an eyelet adapted to receive a fishing line at the opposite end of said shank, a closed lure body having a substantially transparent wall partially enclosing said shank in an oblong cavity having its long dimension in the general direction of the length of said shank, and the opposite ends of said body being sealed liquid tight to said shank, and liquid substantially filling said cavity leaving a small air bubble in said cavity and visible through said transparent wall from outside the lure body, said bubble being considerably less in length than the long dimension of said oblong cavity and the surface of said wall next to said cavity being configurated for said air bubble to race freely from end to end of said cavity on said long dimension, thus for said bubble to simulate in view through said transparent wall a bubble emitted by a living organism in the environs of said barbed hook member when said lure body is tilted to attract fish.

References Cited in the file of this patent

UNITED STATES PATENTS

| | | |
|---|---|---|
| 231,912 | Irgens | Sept. 7, 1880 |
| 1,612,264 | Cressey | Dec. 28, 1926 |
| 1,846,538 | Albers | Feb. 23, 1932 |
| 2,106,755 | McArthur | Feb. 1, 1938 |
| 2,237,883 | Lipic | Apr. 8, 1941 |
| 2,546,516 | Nardi | Mar. 27, 1951 |
| 2,598,360 | Cummins | May 27, 1952 |
| 2,641,862 | Poe | June 16, 1953 |
| 2,706,359 | Beames | Apr. 19, 1955 |

FOREIGN PATENTS

| | | |
|---|---|---|
| 19,148 | Great Britain | 1891 |